May 26, 1931.  J. B. CLARK  1,807,336
GLASS GOB DISPOSING MEANS
Filed Oct. 11, 1928   3 Sheets-Sheet 1
FIG. 1.
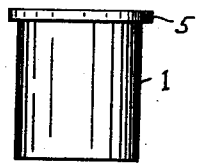
FIG. 3.
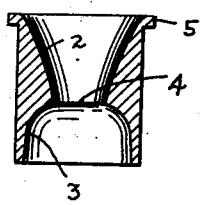
FIG. 2.
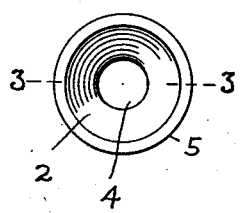
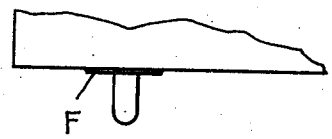
FIG. 4.
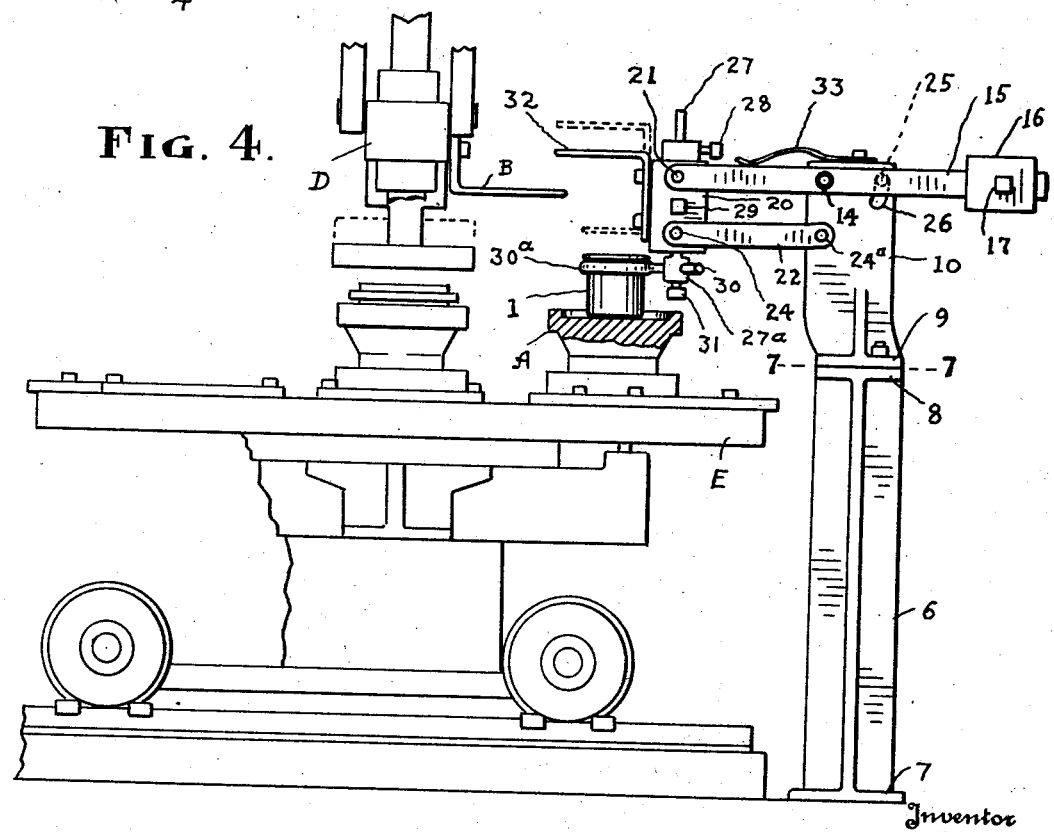
Inventor
JEDDIAH B. CLARK
By Thomas L. Ryan
Attorney May 26, 1931. J. B. CLARK 1,807,336
GLASS GOB DISPOSING MEANS
Filed Oct. 11, 1928 3 Sheets-Sheet 2
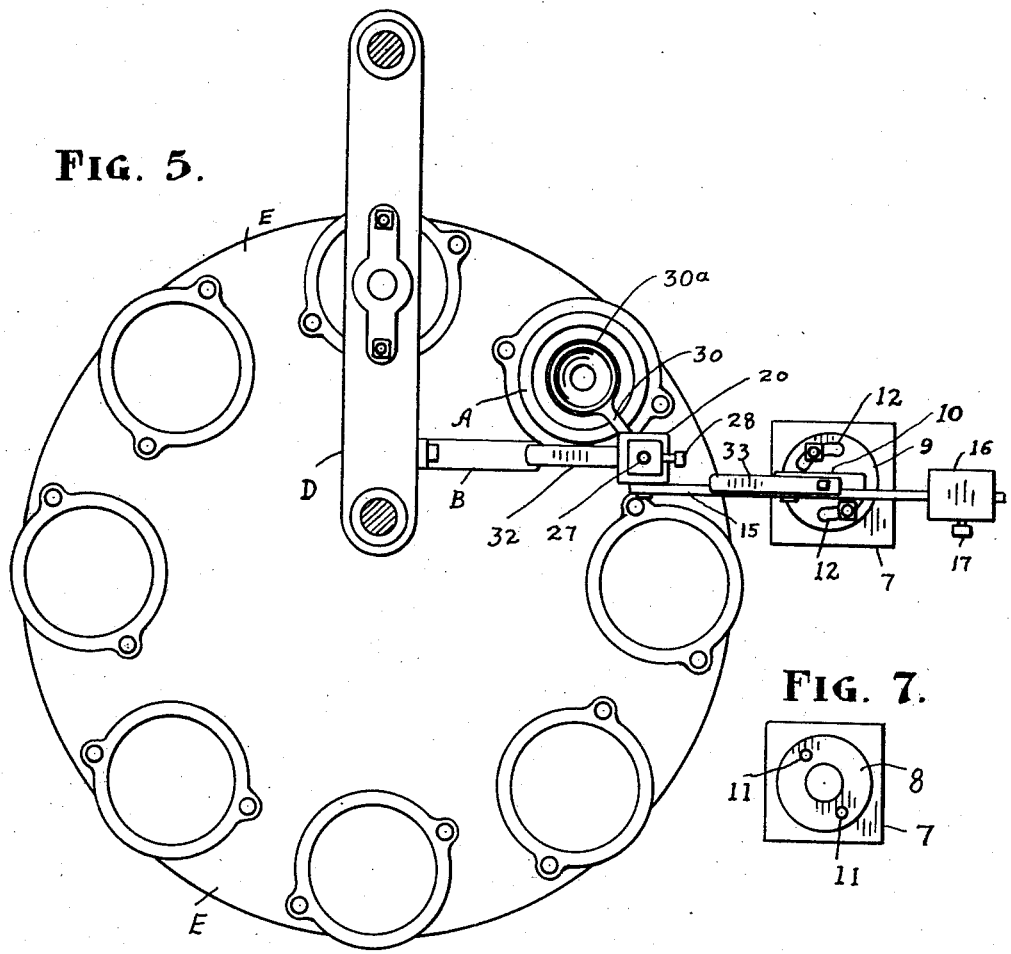
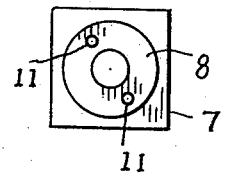
Inventor
JEDDIAH B. CLARK
By Thomas E. Ryan
Attorney May 26, 1931.  J. B. CLARK  1,807,336
GLASS GOB DISPOSING MEANS
Filed Oct. 11, 1928   3 Sheets-Sheet 3

Inventor
JEDDIAH B. CLARK
By Thomas L. Ryan
Attorney

Patented May 26, 1931

1,807,336

UNITED STATES PATENT OFFICE

JEDDIAH B. CLARK, OF DUNKIRK, INDIANA

GLASS-GOB DISPOSING MEANS

Application filed October 11, 1928. Serial No. 311,908.

This invention relates to improvements in means for disposing the glass gob on the mold, in the art of forming articles of glassware. In the making of articles of glassware, by pressing, it is essential that the gob therefor, in its delivery to the mold, shall be disposed thereon correctly. If the gob will not have been properly disposed on the mold, a pressure of abnormal degree is required, to cause the glass to fill the mold. The ware formed under the above circumstances is inferior and out of true, and furthermore there is impairment of the mold and mold parts, and irregularity, unsteadiness, and interference in the functioning of the machine parts actuating the pressure devices and the mold-moving mechanisms.

The object of the present invention is to provide means to cause the gob, as it nears and reaches its destination on the mold, to be properly disposed on the mold. In other words, means to dispose the gob at desired position, and in symmetrical mass status preparatory to its being operated on by the pressure means, regard being had to the nature of the mold, and to the nature of the design of the article to be pressed.

The invention consists of a body element, which may be designated as a disposer head, and which is provided with a conical or funnel-shaped bore, there being a recess in the bottom of the head and which communicates with the mouth of said bore, the said disposer head being adapted for operation in connection with the mold in which the glass is to be pressed, and in such manner that at the moment of delivery of the gob to the mold, the disposer head and mold are in close relation; and in the following moment, or moments, are in relation distant from each other.

The common method of the handling of the molds, in the art of forming articles of glassware by pressing, being to support and carry said molds in a horizontal plane, the embodiment in which my invention is shown, consists, broadly stated, of means to support the disposer head immediately above the face of the mold and operable to raise same, and adapted to be actuated to lift the disposer head to a plane above that of the mold, and to retain it at such plane during the moment the mold is being moved from the receiving station to the pressing station.

My invention is shown in a form, construction and arrangement suitable for use in connection with a machine or apparatus of that type comprising a circular rotatable table or carrier, molds on the carrier, and a mechanism to lower and raise the plunger in the operation of pressing. It is understood that a machine of this kind is operated at a position adjacent to the feeder breast of a glass melting furnace or working chamber. That the mechanisms for performing the several functions, comprising the severing of the gob from the molten supply; the operation of the plunger, and the moving of the table, are coordinated by power transmitting connections, or are actuated at predetermined moments, by timing devices.

A machine or apparatus of the above named class, and the functions performed by same, are so well understood by those skilled in the art to which the present invention relates, that the foregoing brief reference thereto, and an outline showing thereof in the drawings, is deemed sufficient.

The objects of my invention are accomplished by, and the invention is embodied in the new construction, combination and arrangement of parts described in the following specification and illustrated in the accompanying drawings. The invention is defined in appended claims.

The several parts of the invention as they appear in the different views in the drawings, are identified by suitable characters of reference.

Figure 1 is a side view of my new disposer head.

Figure 2 is a top plan view of Figure 1.

Figure 3 is a vertical central sectional view taken on the line 3—3 of Figure 2.

Figure 4 is a side view of a mechanism of preferred form for supporting and operating my improved disposer head in connection with a machine of the kind above referred to.

Figure 5 is a top plan view of Figure 4.

Figure 7 is a top plan view taken on the line 7—7 in Figure 4.

Figures 9, 10, 11, 12:
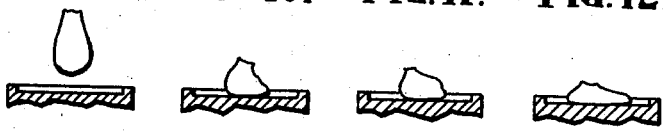
Figure 9 is a view illustrating the form commonly assumed by the gob after its having been severed from the source of supply, and after having almost completed its descent to contact with the mold.
Figure 10 is a view illustrating an irregular shape assumed by the gob after same has alighted on the mold, and where no means have been used to dispose the gob.
Figure 11 is a view showing the shape of the gob which has not been disposed.
Figure 12 is a view showing a typical form assumed by a gob which has not been disposed, same being irregular in mass contour, and in uncertain position on the mold.
Figure 8:
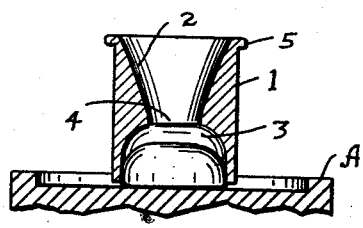
Figure 8 is a detached sectional view showing the disposer head and mold, in the relative positions occupied by them, at the moment just before the disposer head is lifted; and showing the shape of the gob, same having been caused by the disposer head to alight on the mold at desired position, and being prevented from spreading inequably.
Figure 6:
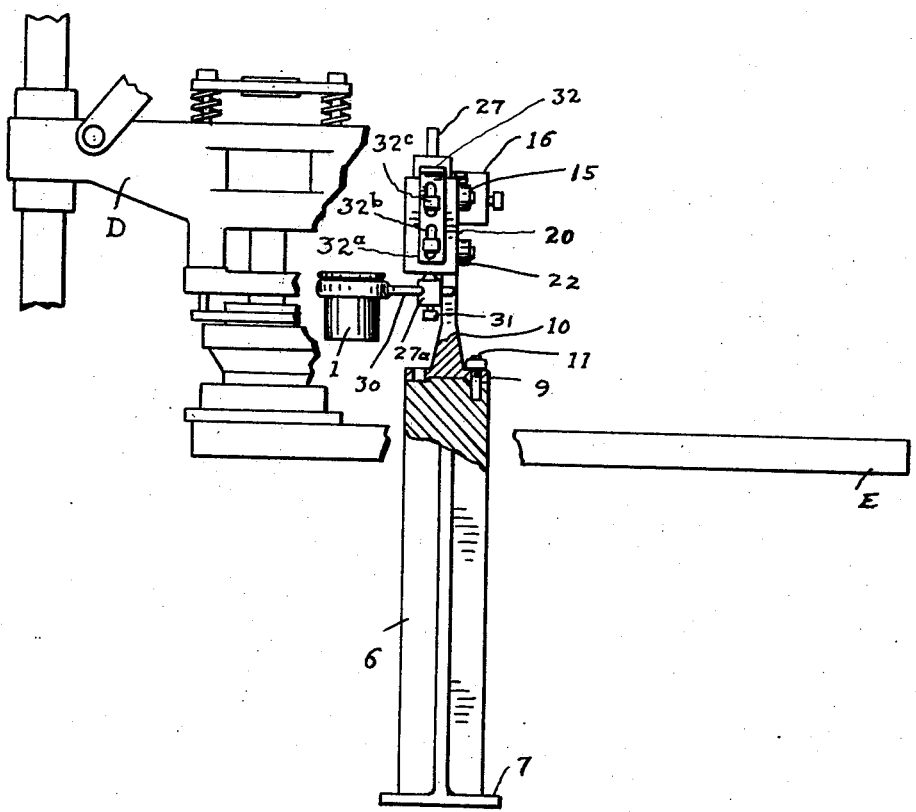
Figure 6 is a front view of my invention as shown in Figure 4.

My improved gob disposing device comprises a disposer head 1 made preferably of cast iron, and which in the present instance is four inches in diameter and four and one half inches in height. It is provided with a central funnel-shaped bore, the surfaces 2 of which are preferably slightly convex. A recess 3 of dome-like formation in cross section which is provided in the bottom portion of said head is concentric with and has communication with the mouth 4 of said bore. An integrally formed annular flange 5 facilitates the retention of the disposer head in a yoke member therefor which will presently be referred to.

For the support of the disposer head at a proper height above the face of the mold A, and to enable the raising of said head to a height above the plane of the top of the said mold, I have provided the several parts, and the combination and arrangement thereof, as follows;

A pedestal 6 of suitable height, and which may be made of cast iron, has the base portion 7 adapted to be secured to the floor or to suitable foundation adjacent to the mold carrier in connection with which the invention is to be operated. On the machined top 8 of the pedestal rests the machined base 9 of the frame 10. Studs 11 and 11 which project from the top 8 of the pedestal are engaged by arcuate slots 12 and 12 of the base of frame 10. The frame 10 is held in secure position to which it may have been adjusted on the pedestal, by suitable nuts screwed on the studs 11 and 11.

On a stud 14 which projects from the side of the upper portion of frame 10, a rocker member is journaled. This rocker member consists of a bar 15 pivoted near its central portion on said stud 14. Its forward portion is adapted to support the parts presently to be described, and its rearward portion has a weight piece 16 thereon, adapted to be retained at adjusted positions by a set screw 17.

A vertically disposed cross head 20 is pivotally connected at its upper portion, by a stud 21, to the forward end of the rocker member 15. At spaced position below the said rocker member, and parallel therewith is a swivel bar 22 the forward end of which is journaled on a stud 24 that projects from the lower portion of the cross head; the other end of said swivel bar being journaled on a stud 24ª which projects from the frame 10. By this arrangement the raising or lowering of the rocker member 15 is accompanied by the raising and lowering of the cross head 20, the latter being retained in vertical alignment by the swivel bar 22. The distance of movement downwardly of the rocker member is limited by a stud 25 that projects from the rear portion of said rocker member, and which engages a slot 26 provided therefor in the frame 10. The weight of the cross head 20 and its connected parts presently to be described, is counterbalanced by the weight piece 16, as shown in Figure 4.

In a vertical bore provided in the cross head 20, is retained a support rod 27 which is adapted to be moved either vertically or rotatably to adjusted position, same being held in the vertical adjustment by a set screw 28 and in horizontal adjustment by a set screw 29. In a cross bore of the head 27a of the said support rod 27, is a support arm 30 which is held at adjusted position by set screw 31. The support arm 30 has a ring shaped yoke 30a of diameter to receive the said disposer head 1.

By the above described combination and arrangement of parts, it is practicable to set and secure the frame 10 at adjusted position rotatively of the pedestal 6; and to set and retain the support arm 30 at any desired position so that the disposer head is retained at correct position relative to that which is assumed by the mold when the latter is at the station at which the gob is delivered thereto; as shown in Figure 4, and in the plan view Figure 5.

For the practice of the invention in connection with a pressing machine of the kind referred to herein, there is secured to the cross head 20, a lug member 32 of suitable form and arrangement to be engaged for upward movement by some part of the machine, to lift the cross head 20 at a proper moment, thereby elevating the disposer head 1 a distance necessary to afford clearance of the gob as the mold is moved from its stationary position. The said lug member consists of an angle shaped bar whose vertical leg 32a is provided with slots 32b. By cap screws 32c the said lug member may be secured at desired vertically adjusted position. The movement upwardly of the rocker member 15 is cushioned by a leaf spring 33 which is secured to the top of frame 10.

In a case, as in the present instance, in which the moment during which the disposer head is to be lifted, is immediately subsequent to the moment of the completion of the pressing operation (at the station (see Figure 5) to which the mold carrying the disposed gob will have been passed), a device on the machine for engaging the lug member 32 (to lift the cross head 20 and disposer head) may consist of a catch bar B which is secured to the head member D of the plunger carrier mechanism of the machine. By adjusting the position of the lug member 32, the moment at which same is to be engaged by the catch bar, and the distance through which it is to be carried during the upward stroke of the plunger-carrier mechanism of the machine, may be varied in accordance with the nature and size of the gob carried on the mold, and the design of the article which is to be pressed.

It will be understood that a device of any suitable kind or construction may be used for lifting the disposer head, to permit the passing of the mold after the gob will have been disposed thereon, the character of such device for lifting the disposer-head support means, depending upon the make of the pressing machine, its speed of operation and capacity, and the nature and number of the molds on the carrier, and the character of the ware which is to be formed.

The mold A carried by the machine table or carrier E, and which said mold is intended for the formation of an article of flat ware such as a plate, shallow dish, or the like, is of height and formation in plan and cross section, as shown in Figure 4 and Figure 5. The relative positions of the several parts of my invention when the plunger carrier mechanism will have been lowered, the mold A will have arrived at its station, and the gob will have been received upon the mold, are as plainly shown in Figure 4. The parts of the invention will have been so adjusted that the bottom of the disposer head is at a plane slightly above the plane of the mold surface, and the vertical axis of the disposer head is in such position relative to the vertical axis of the mold as may be proper; this position depending upon the nature and design of the article to be formed from said gob. For the pressing of an article of symmetrical formation, such as an automobile lens, or a conventional flat dish or plate, the disposer head would be positioned with its vertical axis coincident with that of the mold.

The gob, severed at the feeder bushing F of the tank (by usual shearing means not shown), and which falls to the conical bore of the disposer head, passes through the mouth 4 thereof and at position immediately thereunder strikes the surface of mold A. It is at this moment that the recess 3 in the bottom of the disposer head performs its function, and which is that it prevents the gob from becoming distorted in its mass status, and from settling inequably or becoming lopsided. This moment or moments during which the disposer head dwells at the said position, are sufficient within which the said gob becomes settled or set in order, and the disposer head may then be lifted.

I am aware that funnel like devices have been used in connection with apparatus for pressing articles of glassware, for the purpose of affecting the direction of the course of the gob so that the latter will be caused to alight on the mold. Difficulties have been that the position on the mold at which the gob will have been delivered is uncertain and variable; and moreover, the gob becomes deformed;—that is to say,—it assumes an irregular or distorted mass status. Typical forms assumed by the gob on the mold, are illustrated in Figures 10, 11 and 12 of the drawings. The result, in the pressing of a gob of distorted form or mass status is, that the ware may be not filled on edge, or it may be flanged on edge and finned. Moreover the plunger parts and mold rings and parts of the machine are liable to very serious injury, if not actual destruction.

In reading the description of the operation of my invention, as it is shown in connection with a machine of the type referred to in this specification, it will be understood that the rotatable table with its molds, the plunger mechanism, and the several parts of the machine are so combined, and their relative movements are so timed, that as the mold reaches the position in alignment with the plunger (the pressing station), and the pressing operation ensues; the mold next following will have reached the position or station where it is to receive the gob. At this moment the plunger and the disposer head are at the positions as shown in the drawings. Substantially simultaneously with the moment of pressing, there is the release of the gob and which as it strikes the surface of the bore 2 of the disposer head, is caused to take its course through the mouth 4 whence it passes vertically to contact with the face of the mold.

With the completion of the pressing, and during the upward movement of the plunger carrier mechanism, the disposer head is raised. (The raised position of the disposer head is indicated by the dotted lines in Figure 4.) While the disposer head is in said raised position, the mold will have passed from the gob receiving station and to the pressing station; and a mold next following will have taken its place. With the downward movement of the plunger the disposer head is permitted to reassume the lowered position as shown in Figure 4, above the mold, and in readiness to dispose the gob next received.

It is contemplated that variation may be made in the shape of the recess 3 of the disposer head, in accordance with the shape of the ware to be formed in the mold, and which may be of formation in plan other than circular, such as oval shaped or of curved or of angular formations.

By the practice of my invention, the gob is disposed and made ready, and is so set in order that it is capable of being pressed to true form, the mold being filled to the edges and the ware coming from the machine being of uniformly perfect grade. Abnormal strains on the machine parts and the molds being eliminated, delays and interference in production operations are minimized and the capacity of a machine being served by said invention is materially increased. Variation in temperature or mass texture or the nature of the glass, or changing temperature conditions under which production is being carried on, may be easily and quickly compensated by such adjustments as may be necessary.

Whereas I have shown my invention embodied in form and construction considered practicable for accomplishing the objects for which it is intended, and in form adapted for practice in connection with a machine of common type, I wish it to be understood that changes and modifications of the several parts of the invention may be made, within the scope of the invention as same is defined in the appended claims, without departing from the spirit of the invention or sacrificing any of its advantages. And whereas the invention is shown herein as adapted for actuation by one of the moving parts of the machine with which it is associated, it will be understood that the invention is adapted to be actuated by means of modified form operable either by the machine, or by actuating means controlled by timing devices commonly used in apparatus for making articles of glassware.

What I claim as my invention, and desire to secure by Letters Patent, is—

1. In apparatus of the kind described, in combination with the carried mold, and the plunger mechanism, a support and retention means for a gob disposer head of the kind described, comprising a frame, a rocker member on the frame and having its forward portion at a position adjacent to the path of the mold, a cross head on the forward portion of said rocker member, a headed support rod adjustable vertically and rotatively in said cross head, means to secure said support rod in adjusted position, a yoke within which the disposer head is retained, adjustable connections between the yoke and said headed support rod whereby to vary the position of the gob disposer head horizontally, means to limit the distance of the downward movement of the forward portion of the rocker member, means to cushion the upward movement of the rocker member, a counter weight on the rearward portion of the rocker member, a lug on the said cross head and a catch member carried by the said plunger mechanism whereby with the upward movement of the plunger the said cross head may be raised.

2. A support means for a gob disposer head of the kind described, comprising a frame, a rocker member on the frame, a cross head swiveled on the forward end of the rocker member, a headed support member retained adjustably vertically and rotatably in the cross head, a yoke member adapted to retain the disposer head, connections between the support member and the yoke member whereby the latter may be moved to and retained at positions toward or from and rotatively of said support member, means to limit the distance of the downward movement of the forward portion of the rocker member, a weight piece carried by the rearward portion of the rocker member as a counterbalance, and resilient means to cushion the upward movement of the rocker member.

3. In combination with a machine for making articles of pressed ware, having molds arranged in circular serial formation and carried rotatively about a vertical axis, plunger and pressing mechanisms for said molds, and a feeding means for separating mold charges from the source of supply at a distance above the mold, a disposer head having a funnel shaped bore, there being a recess in the bottom of the head communicating with and flaring from the mouth of said bore, a frame disposed at position adjacent to said machine, a vertically reciprocable rocker member on the frame, a cross head swiveled on the forward end of the rocker member so as to operate in vertical alignment, a support rod retained adjustably, vertically and rotatably in said cross head, and having an integral cross head thereon, a yoke member in which the disposer head is removably retained, the said yoke member having an arm to be engaged in the cross head of said support rod, means to fasten the said arm in the cross head of said support stem, means on the frame to limit the downward stroke of the forward portion of said rocker member, a counter balance weight adjustable on the rearward portion of the rocker member, a spring on the frame to resist the force of the upward stroke of the rocker member, and a catch bar carried by the plunger mechanism of the machine, whereby with the completion of pressing and during the upward movement of the plunger carrier mechanism, the disposer head is raised.

4. In combination with a machine for making articles of pressed ware, having molds arranged in circular serial formation and carried rotatively about a vertical axis, plunger and pressing mechanisms for said molds, and a feeding means for separating mold charges from the source of supply at a distance above the mold, a disposer head having a funnel shaped bore, there being a recess in the bottom of the head communicating with and flaring from the mouth of said bore, a frame disposed at position adjacent to said machine, a vertically reciprocable rocker member on the frame, a cross head swiveled on the forward end of the rocker member so as to operate in vertical alignment, means to support said disposer head in positions adjusted vertically and rotatively in a horizontal plane whereby correctly to locate the disposer head in a predetermined position with respect to the point on the mold upon which the gob is to be deposited, means on the frame to limit the downward stroke of the forward portion of said rocker member, a counter balance weight adjustable on the rearward portion of the rocker member, a spring on the frame to resist the force of the upward stroke of the rocker member, and a catch bar carried by the plunger mechanism of the machine, whereby with the completion of pressing and during the upward movement of the plunger carrier mechanism, the disposer head is raised.

JEDDIAH B. CLARK.